United States Patent Office 3,594,185
Patented July 20, 1971

3,594,185
TREATING FULL-FAT, HULL ENCLOSED
SOYBEANS
Robert L. Hawley, Webster Groves, Mo., and Jesse T. Duren, Belleville, Ill., assignors to Ralston Purina Company, St. Louis, Mo.
No Drawing. Continuation-in-part of application Ser. No. 724,327, Apr. 26, 1968, which is a continuation-in-part of application Ser. No. 643,781, May 12, 1967. This application July 18, 1969, Ser. No. 843,208
Int. Cl. A23l 1/20
U.S. Cl. 99—98
12 Claims

ABSTRACT OF THE DISCLOSURE

A method of and products resulting from treating hull enclosed cotyledons, especially pea and bean legumes, particularly soybeans, to remove objectionable flavor, to remove or alter physiologically objectionable sugar constituents, to alter the density and texture to provide a desirable texture, and basically to produce a full-fat edible product retaining the desirable oils, by the use of a special combination of controlled dry heating of the complete bean externally and internally, to alter the internal and external characteristics thereof, followed by controlled water treatment to further alter the altered structure. This is followed by roasting to obtain edible nut-like products. The beans may be treated with flavor material, sugars or oils to obtain different edible nut-like products having desirable flavor and texture. Also the beans may be subjected to roasting and grinding to obtain edible spread type products.

---

This application is a continuation-in-part of our copending application Ser. No. 724,327, filed Apr. 26, 1968, which is a continuation-in-part of our copending application Ser. No. 643,781, filed May 12, 1967, now abandoned.

BACKGROUND OF THE INVENTION

This invention relates to the treatment of hull enclosed cotyledons, especially bean or pea legumes, particularly those having characteristics preventing or inhibiting use thereof as food, a prime example of which is soybeans, and more particularly relates to a method of chemically and physically modifying such to provide an oil or fat containing food, by rendering their flavor acceptable, rendering them physiologically compatible to the human digestive system, and rendering them texturally pleasing as food.

The present development was made largely in connection with soybeans, because of the potential nutritional value of such, the widespread availability of this legume. One important aspect of the present invention is the unique method of treating soybeans to overcome the significant physical and chemical problems preventing commercial practical conversion of raw soybeans into a highly desirable, full-fat food product. Another aspect of the present invention is to provide a unique method of altering the flavor and oil content of soynuts to obtain improved flavor and textural characteristics of dehulled soynuts. Hence, the invention will be explained largely with respect to soybeans. In fact, the present invention has proven to be extremely effective processes for treating soybeans. However, the processes, in the broader concepts of these inventions, have also been found to be effective for converting other legumes, specifically beans and peas into modified food products.

The term "complete seeds," or "complete beans" when used herein shall mean beans or peas with the hulls in place enclosing the cotyledons.

The term "full-fat" when used herein refers to the characteristic of retaining desirable natural oils in the food product produced, as opposed to products from which the oil is extracted as is conventionally practiced in the industry.

Soybeans as naturally found, either as a wild bean or a cultivated bean, are not a desirable food for humans because of their flavor, density and the presence of trypsin inhibitors, hemaglutinin and stachyose. Utilization of these beans is somewhat limited because of their natural characteristics. If a normal dried soybean with hull intact is placed in warm or cold water it will hydrate, i.e., absorb water to its fullest capacity with 8 to 24 hours. The water passes through the hypocotyl, and then to the cotyledons. If the hull of a normal dried soybean is damaged, (i.e., cracked or torn) and this bean is placed in water, it will hydrate more rapidly because the water can by-pass this special flow path. However, the cotyledons will absorb moisture non-uniformly and will disintegrate. This disintegration exposes and ruptures internal cell walls, thus allowing protein, fats (i.e., oils) and sugars to be leached into the soak water. The loss of the cell contents represents a monetary loss to a soybean processor for they will be discarded with the soak water. In addition, when the soak water is so contaminated with proteins, oils and sugars, the bacterial growth during the soaking period of 8 to 24 hours is phenomenal.

It is impossible in normal consumer practice to obtain soybeans in which there are no cracked (torn) hulls or broken beans. Yet, it is desirable to soak soybeans in water and then use the soaked soybean in the development of further processed human food items. Because of the natural characteristics of soybeans, i.e., beany flavor, density, presence of trypsin inhibitors, hemaglutinin and stachyose and soaking characteristics, the food industry has not found the soybean to be very attractive for use as a whole soybean in further processed human foods. Indeed, the Orientals ferment whole beans in order to render them edible.

Soybeans cannot be used to manufacture an acceptable soynut butter according to presently known techniques because in its natural state the soybean is too dense, the soybean hull adheres too tightly to the cotyledons to be readily removed, and the resulting product has an unpleasant "mouth feel" texture. If the soybeans are roasted, they tend to burn rather than roast like a peanut. If this roasted soybean is ground into butter, it tends to be coarse and unpalatable due to the presence of soy hulls as well as the over roasting. The hearts (hypocotyls) cannot be readily removed. Even if these items are removed, a spread made from the beans has a sandy mouth feel which can be corrected only by the addition of water. Such a product tends to spoil unless kept refrigerated, and then it may become too thick to spread.

We have found that if normal field dried soybeans are treated in a certain manner, the hydration characteristics of the bean are dramatically and totally changed from the norm, that the hull can be totally and easily separated from the bean, and that the hearts (hypocotyls) can be readily removed and separated from the cotyledons. In addition cotyledons treated in this manner may be ground to obtain an edible spread type product having desirable flavor and textural characteristics. Further, we have found that cotyledons which have been dehulled and soaked in water to leach out the undesirable flavor constituents may be treated with flavors, sugars and oils to obtain products which are nut-like.

Soybeans thus present several particular characteristics presently preventing economical commercial conversion into edible full-fat products such as simulated nuts or soynut spreads. In brief, firstly, dependable dehulling is extremely difficult to achieve; secondly, soybeans contain objectionable bitter flavor characteristics; thirdly, soybeans contain physiologically objectionable substances such as trisaccharides and tetrasaccharides; fourthly, soybeans cotyledons, even after dehulling, are so extremely dense as to be texturally inedible; fifthly, even the comminuted soybeans have a grainy or sandy mouth feel which renders them unpleasant to eat; sixthly, soybeans which have been dehulled and had the undesirable constituents leached therefrom are lacking in flavor; and seventhly, soybeans have a low material oil content as compared to other beans and nuts which renders them less desirable to eat than other nuts.

Further, these undesirable characteristics are interrelated to the extent that efforts to overcome one frequently adversely affects efforts to overcome another. Also, efforts to overcome one or more of these characteristics frequently adversely affects efforts to retain desirable nutritional components such as the proteins or the oils, or causes disintegration of the bean, or produces undesirable mouthfeel and textural characteristics in the bean. These factors are illustrative of the many complications involved which have largely prevented any significant commercial conversion and sale of soybeans or like legumes in the form of oil retaining edible simulated nuts or spreads, in spite of the common knowledge of the high potential nutritional value of the bean.

Consequently, although many proposals and even patented methods have been devised for making such food products from soybeans, and although the market is ripe for such products, each proposed method, as far as is known, has significant drawbacks preventing commercial exploitation, as is attested to by the absence of such food products in the market. Other legumes or hull enclosed cotyledons frequently present difficulties also.

A great amount of the difficulty lies in the fact that even the simplest treatment steps have largely unpredictable chemical and physical results in the item, particularly soybeans.

SUMMARY OF THE INVENTION

It is a primary object of one aspect of this invention to provide a specific special sequence of treatment steps that enable soybeans and like legumes to be commercially converted from the raw completed bean to a full fat delectible food, particularly as simulated nuts or as spreads, retaining the nutritional protein and oil components, with the objectionable flavor and physiologically objectionable components removed, and having a pleasing and edible texture. Moreover, the process is subject to high production output of product, causing dependable conversion of the beans to hull free, highly desirable food.

The novel process preferably employs controlled dry heating of the complete bean clear through to obtain a specific hull cracking characteristic and controlled chemical changes in the body of the bean to cause rapid and uniform hydration in water; to allow subsequent leaching out of certain physiologically objectionable sugars, and to alter the nature of the oils and proteins to prevent subsequent leaching out of these desirable oils and proteins. This is preferably followed directly by controlled water treatment to cause dehulling and removal of the hypocotyls, regulated cotyledon swelling and expansion, and osmotic leaching out of objectionable substances, without disintegration of the cotyledon or loss of proteins or desired oils. This is followed by roasting of the swollen cotyledons in a manner to retain the texture thereof and render them attractive. The cotyledons may then be ground to produce a soynut butter.

Another aspect of the invention is to provide edible nut-like products from beans which have been dehulled and subjected to a water bath treatment, whereby the undesirable constituents of the beans are leached out. These beans are then treated by either (a) soaking the dehulled beans in a sugar solution prior to roasting, such that during the roasting a desirable flavor develops in the beans or (b) subjecting the beans to an oil bath under a vacuum after roasting to permit the oil to be sorbed by the beans to improve the texture and flavor of the beans.

Several objects of this invention will become apparent to those in the art upon studing this disclosure.

DESCRIPTION OF THE PREFERRED EMBODIMENTS

The inventors herein have found particular treatment steps that will produce thhe long sought, full-fat food product from soybeans, enabling rapid relatively simple dependable dehulling without causing the bean to disintegrate, causing rapid hydration and swelling, enabling removal of objectionable flavor characteristics, and allowing removal of physiologically objectionable substances, yet without loss of the nutritionally valuable proteins and oils, effecting a desirable texture to the product to render it attractive as a simulated nut or as a spread, causing it to be receptive to various flavor additions for adaptation to the ultimate product, and causing other related results which render the process commercially practical to produce an economical, highly desirable food product.

One important facet of the process is the treatment of the beans in a manner allowing subsequent water treatment without disintegration of the beans and with leaching out of undesirable constituents but not of desirable constituents. According to the process herein, heating the complete seeds, i.e. with the hulls enclosing the cotyledons, is done by using dry heat. It is realized that patents have issued in recent years that teach of using dry heat to dehull soybeans to prepare the beans for extraction of the oil and use of the remaining meal for animal feed or the like. In practicing these prior processes, it is taught to be important that only the hull is to be heated, to avoid adverse effects on the subsequently extracted oil and to cause proper hull removal and then the hulls must be cooled to allow them to be broken off and the oil extracted. The problems are significantly different when the beans are to be used as fat or oil containing human foods and not for oil extraction.

In the preferred process, where fat containing food products are to be prepared, and where the product texture must be acceptable to humans, it has been found by the inventors that the bean must be heated to an elevated temperature both internally and externally, i.e. heated clear through to an extent to essentially modify the internal seed structure, including the protein and oils. Careful analysis and experimentation have shown that this causes several changes to occur, physically and chemically, in preparation for the water treatment. These changes are advantageous for dehulling, and preparation of the item as a food.

The dry heating can be conducted with heated air, or with heated gases such as combustion gases. Preferably, the beans are dry heat treated such as in a combustion flame, i.e. in heated combustion gases during actual combustion. This not only splits the hull but also partially consumes the hulls.

Experimentation with the dry heating step indicates that the chief criterion to obtain the necessary results is heat input rather than specific time or temperature. The temperature of the ambient hot gases, e.g. hot air or flame combustion gases, may vary from about 175° F. to about 500° F., with the time required being greater for the lower than the higher temperatures. The time for the low temperature is up to about 60 minutes or so, while that for the high temperatures is about 10 seconds or so. The preferred temperature range is about 250°–450° F., with the respective time range being about 10 minutes to about 25 seconds. Although the heat input is believed the controlling criterion, the exact B.t.u. input is extremely difficult to exactly determine for each bean. Also, although the accurate temperature of the center of the bean is extremely difficult to determine, as closely as can be determined, it is believed that a mean interior bean temperature of about 160° F. to 250° F. should be achieved and maintained for a time sufficient to obtain the necessary heat input for causing the important internal as well as external changes in the complete bean.

One effect of this controlled dry heating of the complete bean is to cause the hull to split perpendicular to the long axis of the cotyledons. In the subsequent water treatment, this allows easy hull removal and also rapid moisture entry and hydration of the cotyledons in minutes, i.e. about 15–20 minutes in hot water, rather than requiring many hours when hydrating the cotyledons naturally through the hypocotyl. Yet this rapid hydration will occur without disintegration of the cotyledons or significant loss of proteins or desired oils, because the heat treatment causes internal molecular changes in the bean which prevent this. A full technical explanation of these changes is not known. The oils are apparently rendered stable to osmotic leaching. The proteins are apparently rendered insoluble by being denatured. The hull splitting also causes hull removal to be simple and complete in the subsequent step. Further, this thorough heat treating step also causes some improvement in flavor.

After the complete beans are heated thusly, they are immersed in water, preferably while the beans are still hot. By gently agitating the water and beans, the hulls are readily released from and fall off the cotyledons. By slightly more vigorous agitation or rubbing, the hypocotyls are also released from the cotyledons, to allow their removal with the hulls. This is desirable because the hypocotyls are a source of bitter unsaturated oils, and because their removal extends the shelf life of the product considerably. If desired, the hulls and hypocotyls may be removed by mechanical means, as is well-known in the art, before subjection of the cotyledons to the water treatment. The mechanical dehulling may be slightly more efficient than dehulling in the water treatment.

During the water treatment, the cotyledons rapidly and uniformly absorb moisture, without disintegrating, causing swelling and expansion of the high density cotyledons to a size 2–3 times the original, with a density of only ⅓–½ of the original. This swelling and expansion causes the cell structure to expand and open. This is very significant to the texture of the final product. It is also significant in facilitating osmotic extraction or leaching out of constituents causing bitter flavor and objectionable tri- and tetra-saccharides such as tri-saccharide manninotriose and stachyose which would otherwise produce flatus in the consumer.

The water treatment may vary somewhat depending upon the final product characteristics desired. If the final product is to be a roasted nut without other added flavor, it is desirable to remove much of the tri- and tetra-saccharides because of flatus production, but to retain some of the unobjectionable mono- and di-saccharides to allow proper roasting to a golden color. In this case, the water treatment may constitute water soak. This soak allows dehulling, cotyledon swelling, and significant removal of bitter flavor causing constituents. If one desires to add other sugars to the water treated items, as by soaking in a sugar solution, to obtain optimum roasting characteristics, the water treatment may comprise a water soak, followed by the cooking in water to remove most of the natural sugars including the objectionable tri- and tetra-saccharides, but also the unobjectionable mono- and di-saccharides. This cooking step is advantageous in more effectively removing bitter flavor causing constituents as well as objectionable sugars, but may require subsequent addition of sugars to the product if cooking is extended to remove substantially all natural sugars, and if the product is to be roasted under optimum conditions. This sugar leaching is very effective if the water is boiled for about ½ to 1 hour during the soak. Boiling also bleaches the cotyledons to a more attractive light shade. Actually, the time of soaking may vary from about 15 minutes to about 60 minutes or so, with 15–20 minutes being normally sufficient. The cooking time may also be 15–60 minutes, but in actual practice, if the cotyledons are going to be cooked, they may be placed directly into hot cooking water after heat treating since the results of water soak occur simultaneously with the results of cooking. During this water treatment, most effective sugar leaching is obtained with either multiple change of the water on a batch basis, or with continuous exchange of the water on a continuous processing basis, to keep the sugar concentration in the water relatively low. If this sugar concentration in the water is not kept low, the osmotic leaching action of the sugars is lessened considerably. Yet, if the previous heat treatment is properly carried out, the valuable proteins and desirable oils remain intact in the cotyledons and do not leach out as normally occurs when soaking hulled soybeans in water.

The separated cotyledons, when removed from the water bath, are intact, in whole form, with smooth surfaces and an appealing nature, have an excellent open texture, possess the desirable nutritional constituents, and are generally free of the undesirable internal constituents and external components.

Thse moist cotyledons are then roasted, either in hot oil or by dry heat, to produce appealing full-fat or oil containing roasted soy nuts which have good chewing characteristics, are tasty, are not bitter, and are highly nutritious. Roasting may be delayed after the water treatment, provided the product is kept moist to prevent dehydration and consequent shrinkage back to the high density product. If this roasting is done rapidly, the swollen cotyledons retain substantially all of their expanded size. The temperature range for roasting is about 250° F. to 600° F. The time of roasting varies somewhat inversely with the temperatures, and being in the range of about 30 minutes to about 5 minutes.

The nuts can also be converted to a spread by mixing in such ingredients as oils, sugars, salt, flavors, and stabilizers, and grinding the mixture to an appealing soy nut butter, tallow, or the like, depending upon the nature desired in the product. The oils may be partially hydrogenated to give a thicker consistency to the spread. The sugar may be of any edible type such as sucrose, lactose, etc.

The flavors may be any of the hundreds known and available, including various spices, extracts, etc. Stabilizers, if used, are merely to prevent oxidative rancidity, and therefore may be any of the known edible food grade antioxidants such as butylated hydroxy anisole, or butylated hydroxy toluene, to name only a couple of the many known types of such available. The range of oil to soy nuts may vary within the general range of 20–85 parts by weight of oil and 80–15 parts by weight of soy nuts. The amount of salt and sugar added is to suit taste, i.e. about 0–5 parts by weight of salt and 0–30 parts by weight sugar. In contrast to previous ground soy spread products, the novel spread has a pleasant mouth feel, free of the sandy or grainy texture.

It is to be understood that the novel spread products as described herein may be produced from most any edible, dry heat treated, dehulled cotyledon seed material.

Another aspect of the present invention is that dehulled cotyledons and particularly soybeans may be treated in such a manner to obtain edible nut-like products having desirable flavor and texture. Although the previous description utilizing dry heat to remove the hulls is the preferred method of obtaining the dehulled cotyledons; it is possible that cotyledons which have been dehulled by other methods well-known in the art may be treated in accordance with the present invention. More particularly, the cotyledons, such as soybeans, may be dehulled either mechanically or by submerging the beams in boiling water to remove the hulls. The cotyledons after having their hulls separated therefrom. should be subjected to a controlled water treatment, such that a leaching out of the undesirable constituents is achieved. The water treatment may consist of either soaking or cooking the cotyledons, as previously discussed. Since the prime object is to obtain preferred flavor and texture in the cotyledons, preferably the water treatment will consitiute the coking of the cotyledons.

However, it should be recognized that if the dehulled cotyledons have not been subjected to the dry heat treatment prior to the controlled water treatment, some of the desirable constitutents such as the nutritionally valuable proteins or oils, will be leached out of the cotyledons, with the undesirable constituents.

Following the water treatment and prior to washing, the cotyledons should be subjected to another or second water bath containing a sugar and salt. Any sugar may be utilized, with sucrose being preferred, however, other mixtures of sugars may be incorporated in the bath to alter the flavor of the nuts. Preferably the sugar content of the bath will not exceed 50% by weight and the salt content will be in the range of 1–20% by weight. In addition to water, a hydrolized vegetable or animal protein or other flavoring materials may be included in the second bath. Alternatively, the second bath may include a flavor enhancer, such as monosodium glutinate or one of the prime inosates. The second bath is heated to a temperature in the range of 150–212° F. and preferably is about 210° F. to facilitate the sorbing of these ingredients by the cotyledons. The period of time the cotyledons should be immersed in the heated solution varies inversely with the temperature of the bath and is in the range of approximately 10 minutes to 10 seconds. Preferably, when the second bath is maintained at 210° F., the cotyledons will be immersed for a period of 30 seconds.

The cotyledons when removed from the second bath have sorbed a sufficient quantity of the desirable constituents such that upon roasting a desirable flavor is developed in the nuts. The roasting should be carried out by heating the nuts to a temperature between 250° F. to 600° F. for a period of time in the range of about 30 minutes to 5 minutes, respectively. This roasting serves to develop a desirable flavor and pleasing appearance in the nut.

As a further alternative to improving the flavor and texture of the dehulled cotyledons, the cotyledons after roasting may be treated to alter their oil content to obtain a high-oil content nut product. Soynuts normally have an oil content of approximately 25% as compared to oil contents of 50% or more for other nuts, such as peanuts or walnuts. This high-oil content contributes to the mouth feel and flavor of the nuts. It is desirable in producing a nut-like product from soynuts that the total oil content of the nuts be raised to a maximum value of approximately 75% by weight and preferably to approximately 50%–60% to resemble other types of nuts. Merely spraying or dipping the roasted soynuts with flavoring material results in only a small portion of the oil being sorbed by the soynuts. Also, spraying or dipping roasted soynuts with flavoring material results in only a small portion being absorbed. However, by immersing the roasted soynuts in an oil bath under a vacuum, enough oil can be added to the soynuts to alter the mouth feel and flavor of the soynut. The oil or oils may be any of the common vegetable oils such, for example, as safflower oil, peanut oil, soybean oil, corn oil, cocoanut oil, or others and with other liquids such as propylene, glycol, glycerine and alcohols. In addition, flavoring material and oil soluble dyes can be added to the oil to impart the desired color and flavor to the soynuts. The length of time required for the oil sorption will be dependent on the vacuum and the desired total oil content sought. The oil bath should be maintained in the temperature range of between 60°–180° F., with the retention time for the nuts in the bath being dependent on the amount of oil desired to be sorbed by the nuts. Immersion of soynuts in an oil bath for 20 minutes under a vacuum of 28 inches of mercury has proved satisfactory in sorbing oil into the soynut. One skilled in the art will be readily able to determine these parameters for obtaining the desired sorption of oil by the soynuts.

The soynuts are then removed from the oil bath and the excess oil allowed to drain therefrom. An improved high oil content nut product is obtained which has desirable texture and flavor.

A few illustrative examples of the process are as follows:

EXAMPLE NO. 1

Soybeans are heated with hot air at a temperature of 450° F. for 2½ minutes, causing internal changes and causing the hulls to split perpendicular to the main axis of the cotyledons. The beans, while still hot, are put into a water bath previously heated to near boiling. The water is boiled for 45 minutes and agitated, causing the hulls to fall off the beans and the hypocotyls to be released from the cotyledons, causing the cotyledons to swell and expand, and causing osmotic leaching of the undesirable constituents. The cotyledons are then removed from the water, placed in hot oil at a temperature of 425° F. and roasted for 8 minutes. The product is salted and eaten like nuts.

EXAMPLE NO. 2

Soybeans are treated as in Example No. 1, except that the soybeans are heated with a combustion flame for 2 minutes, and the water is continuously exchanged with fresh boiling water. The removed cotyledons are then mixed with an equal weight of an hydrogenated mixture of half cocoanut oil and half cottonseed oil, 4% by weight sugar, and ½% by weight salt. The mixture is then ground to a pasty spread.

EXAMPLE NO. 3

Soybeans are heated with hot combustion gases at a temperature of 350° F. for 6 minutes. The heated beans are placed directly into water and allowed to soak for 25 minutes, while being agitated. The separated cotyledons are removed from the water and roasted by hot air at a temperature of 325° F. for 15 minutes.

EXAMPLE NO. 4

Garbanzo peas (Chick peas) are heated with hot air at a temperature of 275° F. for 8 minutes. The peas are then placed in water and soaked for 30 minutes. They are then roasted in oil at a temperature of 300° F. for 25 minutes.

EXAMPLE NO. 5

The procedures of Example No. 1 are substantially repeated except that the beans are heated with hot air at a temperature of about 425° F. for about 36 seconds. The resulting roasted beans have substantially the same properties as those obtained by the procedures of Example No. 1.

EXAMPLE NO. 6

The procedures of Example No. 1 are substantially repeated except that after the cotyledons are removed from the water bath they are immersed in a second bath as follows:

| | Percent by wt. |
|---|---|
| Water | 75.2 |
| Sugar | 15.0 |
| Salt | 6.8 |
| Hydrolized vegetable protein (Maggie 3H3–4) | 3.0 | cotyledons are immersed in the second bath for 2 minutes with the second bath being maintained at 210° F. The cotyledons are then roasted by hot air at a temperature of 325° F. for 15 minutes and develop a pleasant nutty flavor.

EXAMPLE NO. 7

Soybeans are heated with hot air at a temperature of 450° F. for 2½ minutes, causing internal changes and causing the hulls to split perpendicular to the main axis of the cotyledons. The heat treated beans are mechanically dehulled in the dry state using a Packomatic dehuller. After dehulling, the cotyledons or beans are separated from the hulls by an aspiration system. The dehulled beans are then blanched in boiling water for forty (40) minutes. The beans are then immersed in a second bath, which is maintained at 210° F. for five minutes. The second bath is the same as that of Example No. 6. The cotyledons are then roasted by hot air at a temperature of 325° F. for 15 minutes and develop a pleasant nutty flavor.

EXAMPLE NO. 8

Fifty grams of roasted soynuts treated as in Example No. 1 (without salt) are placed in 200 ml. of corn oil at 70° F. in a vacuum dessicator. A vacuum of approximately 28 inches (mercury) is pulled for 20 minutes with an interruption after about 10 minutes. The soynuts are drained from the oil. The weight of the soynuts after the oil vacuum treatment is 75.6 grams. The soynut product is improved in mouth feel and flavor.

EXAMPLE NO. 9

Soybeans are heated with hot air at a temperature of 450° F. for 2½ minutes, causing internal changes and causing the hulls to split perpendicular to the main axis of the cotyledons. The heat treated beans are mechanically dehulled in the dry state using a Packomatic dehuller. After dehulling, the cotyledons or beans are separated from the hulls by an aspiration system. The dehulled beans are then blanched in boiling water for forty (40) minutes and roasted in a conventional nut roasting oven at a temperature of 325° F. for 15 minutes. After roasting, the soynuts are immersed in an oil bath maintained at 180° F. and under a vacuum of 28 inches of mercury. The soynuts are retained in the bath for 2 minutes. The oil flavor bath is composed of the following:

| | Percent by wt. |
|---|---|
| Vegetable oil (soybean oil) | 92 |
| Salt | 3 |
| Imitation flavors | 5 |
| | 100 |

After immersion of the soynuts in the flavor bath, the soynuts were drained and the resulting product exhibited a very pleasant taste. The oil treatment also has the effect of producing a more nut-like texture to the soynuts.

Many other examples could be set forth, but since the noted examples and the teachings herein are sufficient for one having ordinary skill in the art to practice the invention, additional examples would only be superfluous.

It is conceivable that the conceptual method herein can be practiced in various ways within the criteria set forth. Hence, the invention is intended to be limited only to the definitions provided in the attached claims and the reasonable equivalents thereto.

We claim:

1. A method of treating soybeans comprising the steps of: heating the complete beans clear through with dry heat using ambient gases of about 175° F.–500° F. for a period of about 10 seconds to about 60 minutes to obtain sufficient heat input to the exterior and the interior of the beans to cause their hulls to split, to render the proteins insoluble, to render the oils stable against osmotic extraction in water, to stabilize the cotyledons against disintegration in water, separating the cotyledons from the hulls and agitating the heat treated soybeans in water for at least about 15 minutes to cause the cotyledons to controllably and uniformly swell and expand, and to extract from the expanded cotyledons certain objectionable flavor causing constituents, and subjecting the cotyledons to a second bath for a predetermined period of time to alter the flavor of the cotyledons.

2. The method according to claim 1 including the steps of immersing the expanded cotyledons in a heated second bath having a sugar therein, and thereafter roasting the cotyledons to develop an edible nut-like product having desirable flavor and color.

3. The method according to claim 2 wherein the second bath is heated to a temperature between approximately 150°–212° F.

4. The method according to claim 2 wherein the cotyledons are immersed in the second bath for a period of time between 10 minutes and 10 seconds.

5. The method according to claim 1 wherein the second bath has a sugar content of between 5 and 50% by weight.

6. The method according to claim 5 wherein the second bath includes between approximately 1–20% by weight salt and between approximately 1–10% by weight hydrolyzed vegetable protein.

7. The method in claim 1 including the steps of removing said heat treated and water treated cotyledons from the water, roasting said cotyledons while still moist and swollen, and immersing the roasted cotyledons in the second bath, the second bath being an oil bath, and the roasted cotyledons being immersed in the second bath under a vacuum for a predetermined period of time for the oil to be sorbed by the cotyledons.

8. The method according to claim 7 wherein flavoring and oil soluble dyes are added to the oil bath to impart the desired flavor and color to the cotyledons.

9. The method according to claim 7 wherein the oil bath is maintained at a temperature between approximately 60–80° F.

10. The method according to claim 9 wherein the cotyledons are immersed in the oil bath under the vacuum for approximately 20 minutes.

11. The method according to claim 9 wherein the cotyledons are immersed in the oil bath under the vacuum for a sufficient period of time to increase the total oil content of the cotyledons to a maximum of 75% by weight.

12. The method according to claim 11 wherein the total oil content of the cotyledons is increased to between 50–60% by weight.

References Cited

UNITED STATES PATENTS

| | | | |
|---|---|---|---|
| 1,774,110 | 8/1930 | Sloat | 99—98 |
| 2,135,594 | 11/1938 | Nohe et al. | 99—98 |

A. LOUIS MONACELL, Primary Examiner

W. A. SIMONS, Assistant Examiner